United States Patent Office 3,509,793
Patented May 5, 1970

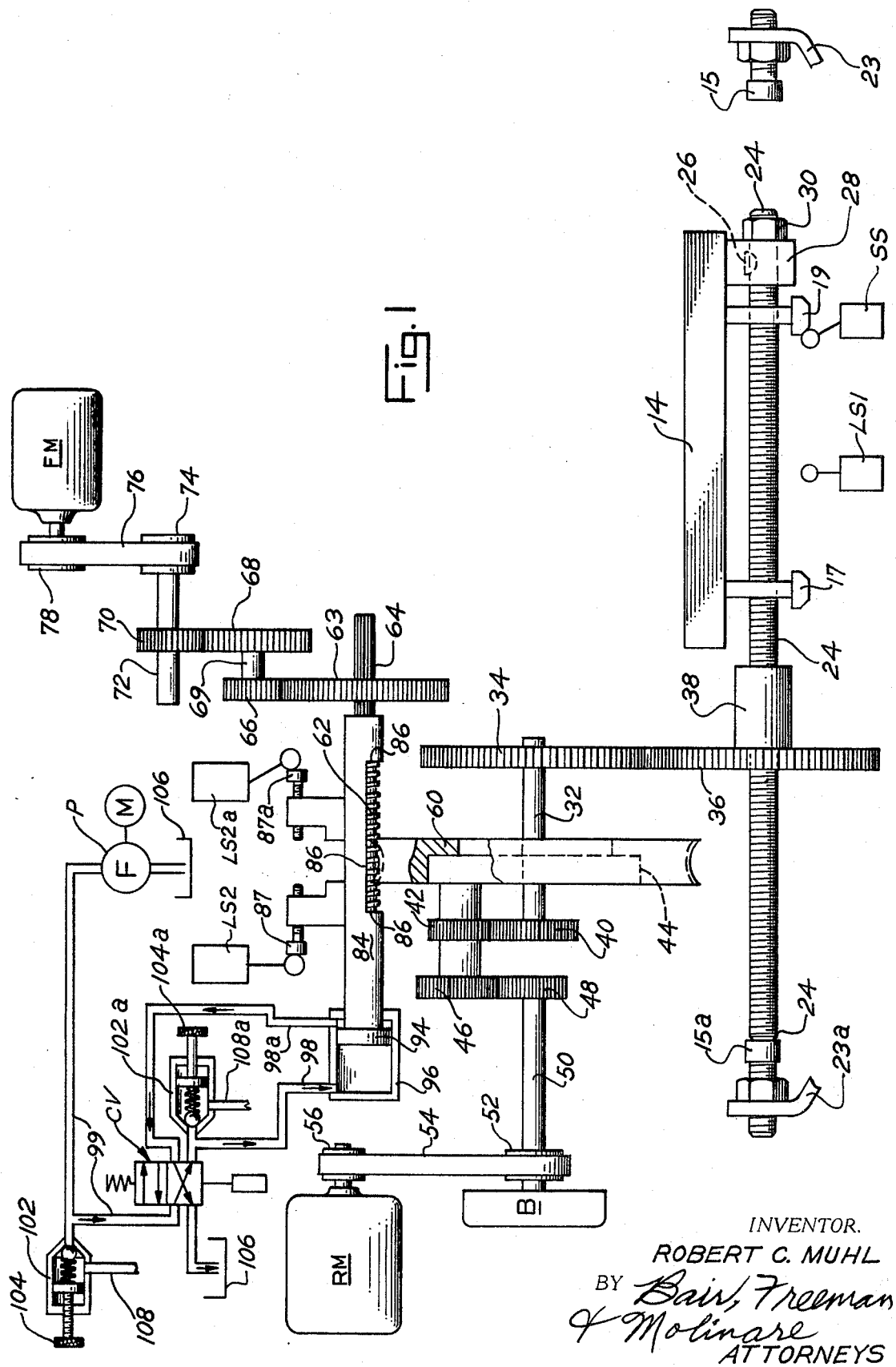

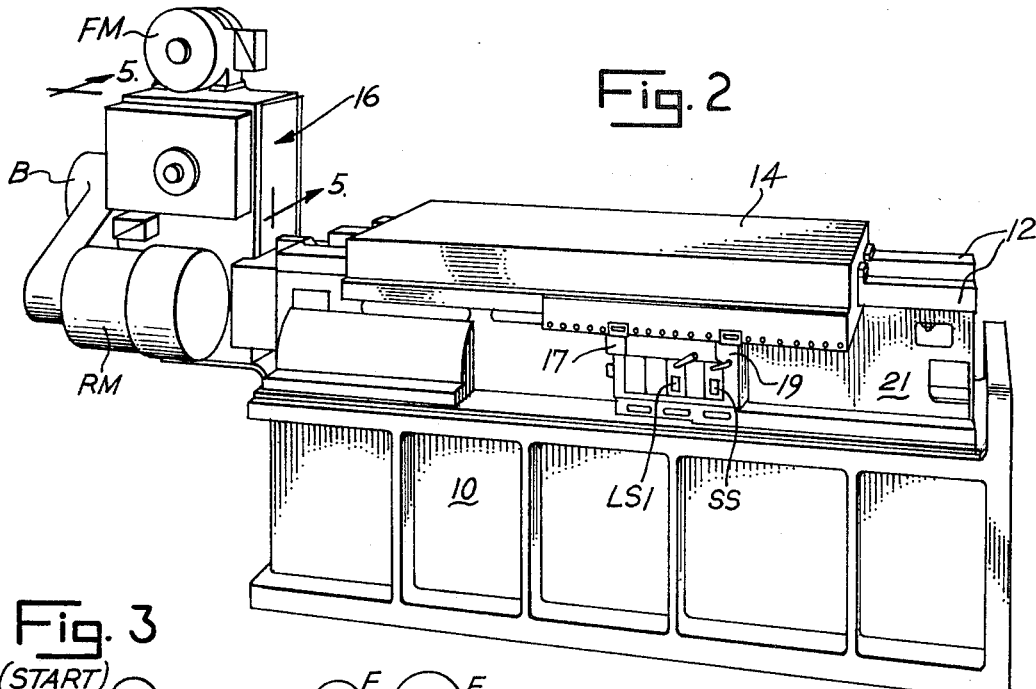
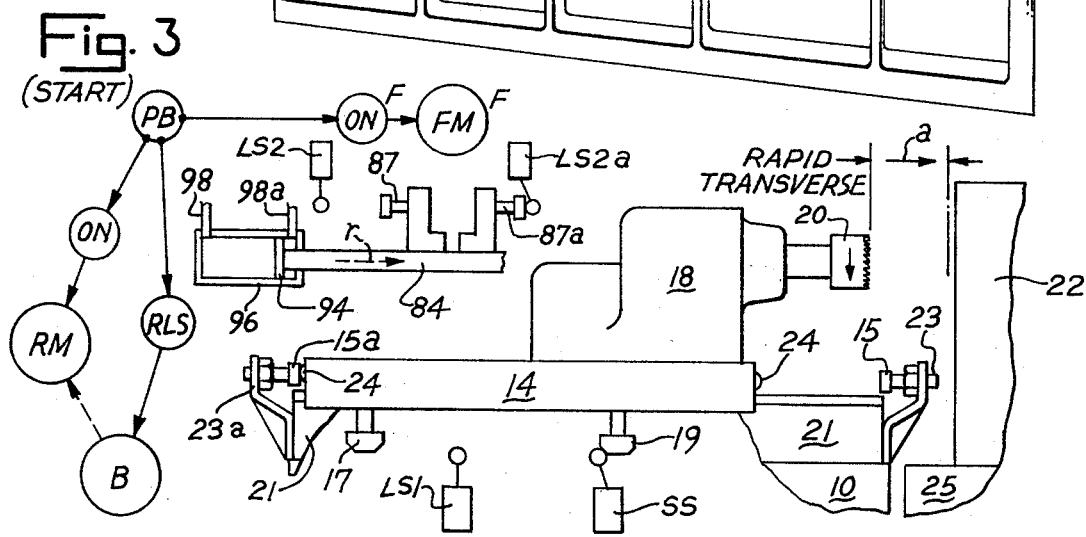
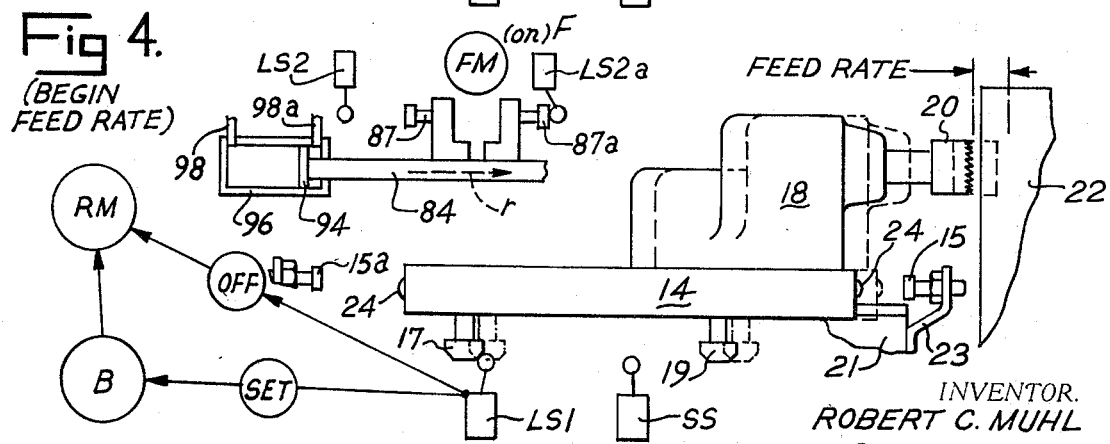

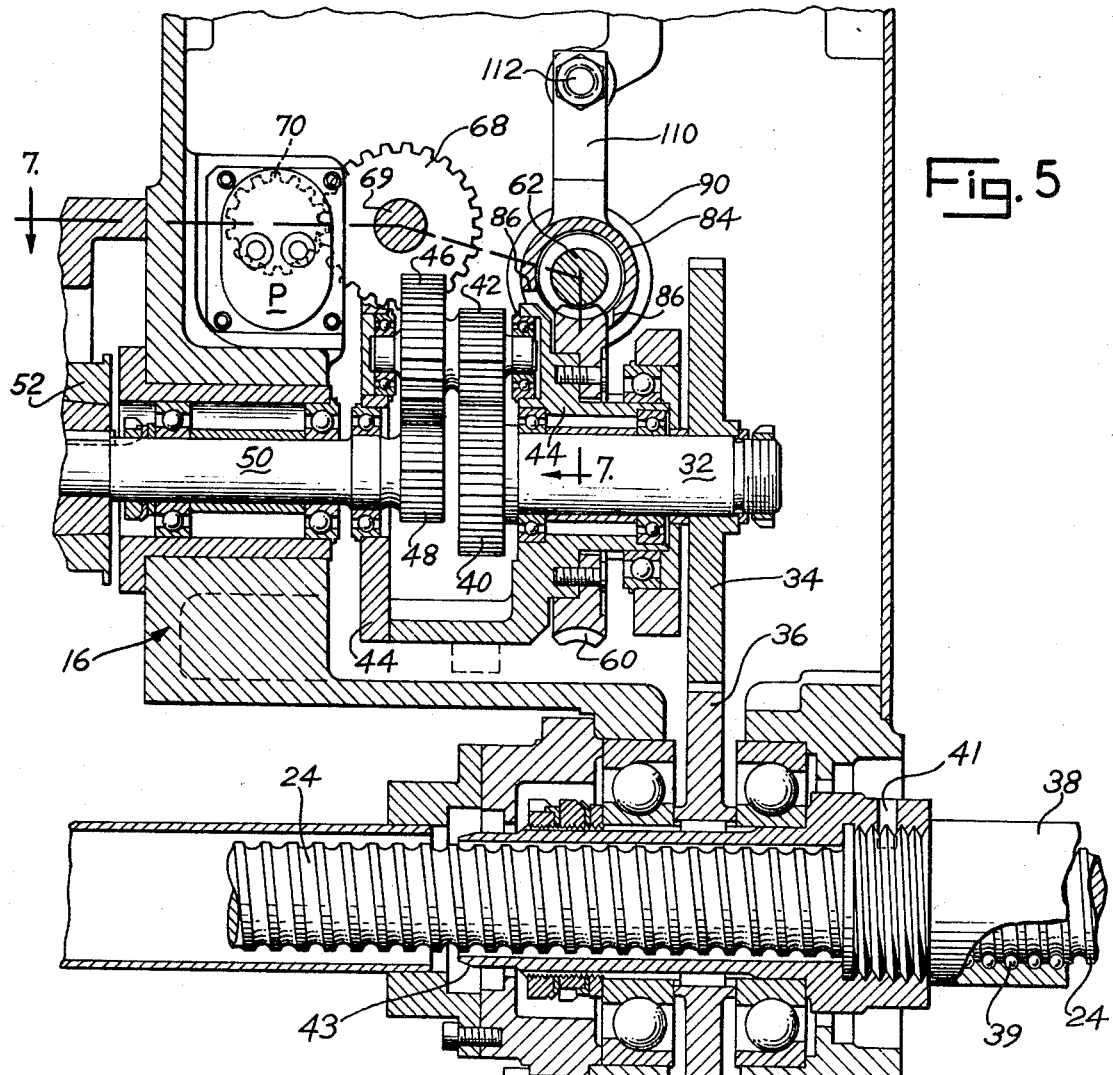
Fig. 5
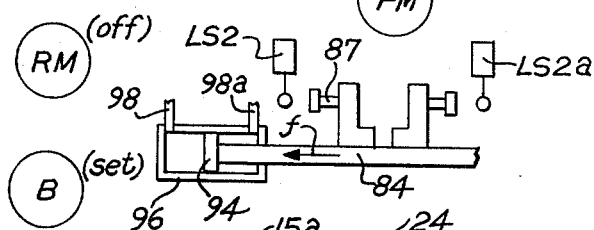
Fig. 6 (POSITIVE STOP AND DWELL)
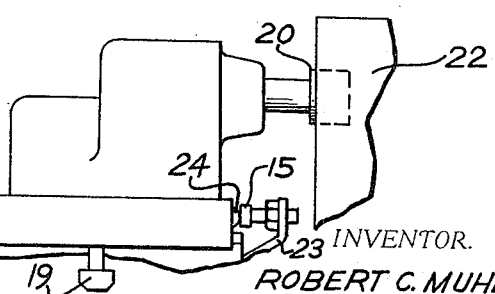
INVENTOR.
ROBERT C. MUHL
BY Bair, Freeman
& Molinare ATTORNEYS

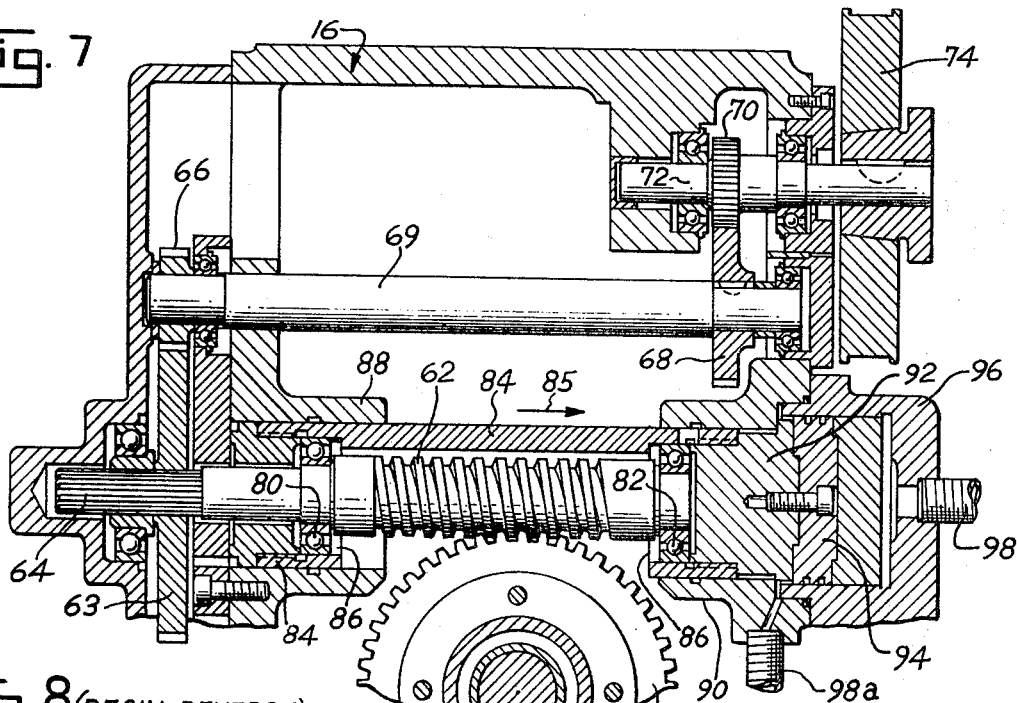
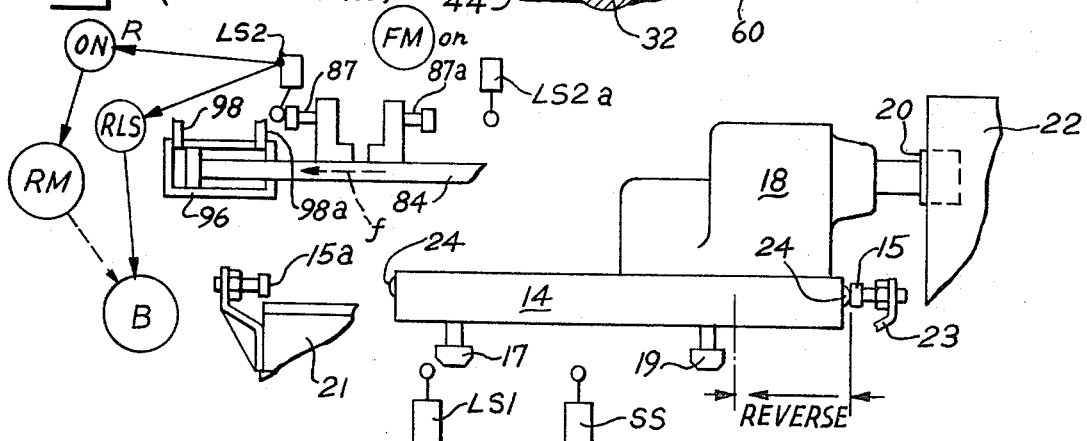
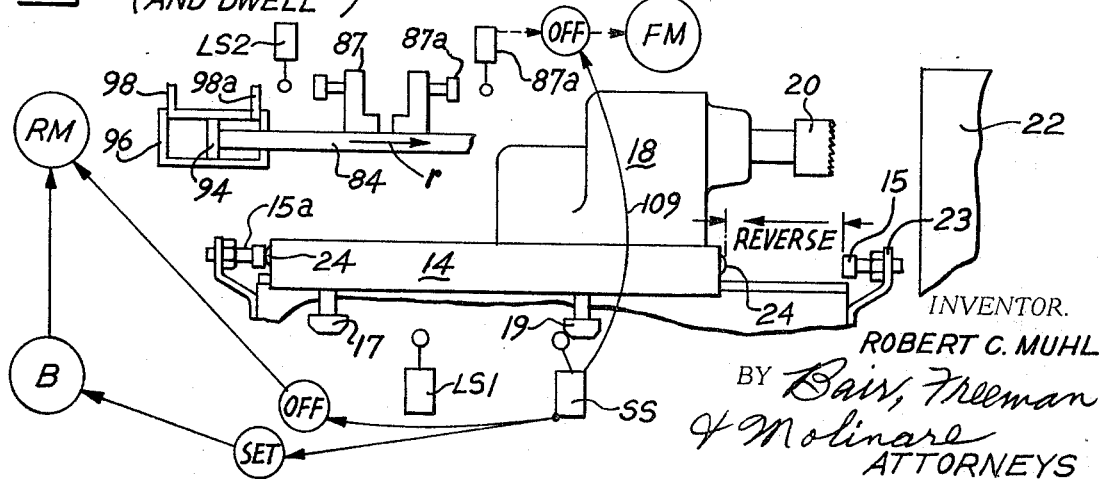

3,509,793
SCREW FEED MACHINE UNIT
Robert C. Muhl, Richmond, Ind., assignor to National Automatic Tool Company, Inc., Richmond, Ind., a corporation of Indiana
Filed Sept. 20, 1968, Ser. No. 761,239
Int. Cl. B23c 9/00; B23b 47/18
U.S. Cl. 90—21
22 Claims

ABSTRACT OF THE DISCLOSURE

Means for driving a machine slide or the like in one direction at a rapid rate and then at a slower rate with a positive constant yet adjustable force up to and against a positive stop, and for effecting dwell against the stop with the same constant force for an adjustable length of time. The machine slide is then driven in the opposite direction at a rapid rate against a second positive stop and caused to dwell there in like manner, whereupon a machine cycle is completed. Fluid under pressure from a hydraulic pump which is driven throughout the cycle maintains a constant pressure and constant supply of fluid for a double acting cylinder. This pressure operates in opposition to the thrust of a worm, after the machine slide has been positively stopped, thereby causing thrust load to build up in the worm until the force exceeds that in the hydraulic cylinder and allows the piston in the cylinder to travel while the machine slide remains against its positive stop with its original constant force. After the worm has travelled for a predetermined distance in one direction, certain circuitry comes into operation to reverse the machine slide, and after the worm has travelled for a predetermined distance in the opposite direction, circuitry comes into operation to terminate the machine cycle. The dwell time for the tool to clean up at the bottom or end of its work stroke and to accomplish a full stroke of the worm in one direction, and to accomplish a full stroke of the worm in the opposite direction are the times the machine slide is against the opposite positive stops.

BACKGROUND OF THE INVENTION

The present invention is an improvement on Anderson Patent No. 2,398,346 and my Patent No. 3,279,321, in that certain elements have been added to the disclosure in the last mentioned patent making it possible to secure dwell action of a machine slide in both directions and eliminate the necessity of slipping a brake, thereby increasing the efficiency of the machine and reducing unnecessary wear within the brake.

In general the present invention relates to a screw feed machine unit such as one having a machine slide on which work is mounted to be operated upon by means of a tool such as a milling cutter, hone, drill or the like.

One object of the invention is to provide means for driving the machine slide or a comparable component, first at a rapid rate and then at a slower rate with a positive, constant yet adjustable force up to and against a positive stop and to dwell against this stop with the same constant force for an adjustable length of time.

Another object is to provide means for propelling a machine slide or the like during machining operations comprising a rapid traverse gear train and a slow feed gear train which are so operatively connected together that both gear trains may be operated simultaneously during rapid traverse travel, and the rapid traverse gear train stopped while the slow speed gear train continues to operate during the work machining portion of an operating cycle such as a cutting operation performed by a tool on a work piece.

Still another object is to provide the slow feed gear train including a worm and worm gear wherein the worm gear is operatively connected to the rapid traverse gear train, a positive stop being provided for the machine slide to limit the depth of cut of a tool relative to the work piece whereupon the worm travels axially with respect to the worm gear while the tool dwells at its final depth to clean up the cut.

A further object is to take advantage of the axial movement of the worm by providing hydraulic means opposing the thrust thereof in either direction to thereby hold the machine slide against either of the positive stops with predetermined pressure during dwell periods in opposite directions, during one of which the tool cleans up at the bottom of its work stroke and thereby facilitates machining to accurate dimensions, and during the other of which it conditions the machine unit for the next machining operation.

Still a further object is to provide a system of controls which permits starting of a machine operation by simultaneous operation of the two gear trains, and cessation of the rapid traverse gear train at the end of a rapid traverse travel whereupon continued operation of the slow feed gear train automatically effects the machining operation at the desired slow feed rate.

An additional object is to provide further controls, one of which is responsive to the axial movement of the worm to reverse the rapid traverse motor, thereby reversing the direction of movement of the machine slide, and controls responsive to the axial movement of the worm in the opposite direction to effect a control for stopping both gear trains after the end of the reverse motion of the machine slide followed by a dwell period, thus conditioning the device for the next machining operation.

Another additional object is to provide a novel gear train arrangement in which the rapid traverse gear train is driven by one power means and includes planetary gearing having a planetary gear carrier rotatable about the output means and provided with a worm gear, and the slow feed gear train includes a worm driven by another power means and meshing with the worm gear.

A further additional object is to provide automatic brake means for the rapid traverse gear train to lock it against operation and thereby cause the planetary gearing to function for propelling the machine slide from the slow feed gear train only.

BRIEF DESCRIPTION OF THE DRAWINGS

FIG. 1 is a diagrammatic view of a screw feed machine unit and the controls therefor embodying my invention.

FIG. 2 is a perspective view of a screw feed machine unit of the type shown diagrammatically in FIG. 1, and shows one physical arrangement for the parts thereof.

FIG. 3 is a diagrammatic view somewhat similar to FIG. 1, showing the significant parts of the unit in "START" position, and illustrates diagrammatically the controlling operations at this time.

FIG. 4 is a similar diagrammatic view showing the position of parts at the "BEGIN FEED RATE" time.

FIG. 5 is an enlarged vertical sectional view on the line 5—5 of FIG. 2, showing some of the gearing of the gear train in the unit.

FIG. 6 is a diagrammatic view similar to FIGS. 3 and 4, showing the parts and controls in a "POSITIVE STOP AND DWELL" position.

FIG. 7 is a sectional view on the line 7—7 of FIG. 5, showing further elements of the gear trains in my screw feed machine unit.

FIG. 8 is a diagrammatic view similar to FIGS. 3, 4, and 6, showing the parts and controls at a "BEGIN REVERSE" time during the operating cycle, and FIG. 9 is a similar diagrammatic view showing the parts and controls at an "END REVERSE AND DWELL" time during the operating cycle.

DESCRIPTION OF THE PREFERRED EMBODIMENT

On the accompanying drawings, and referring first to FIG. 2, a base 10 is shown for supporting a machine slide 14 on ways 12 of a way support 21 of the base so that the machine slide can be reciprocated longitudinally of the base. My screw feed machine unit comprises power means and gear trains contained in a housing 16 mounted at one end of the base 10.

My screw feed machine unit may be provided wherever it is desirable to propel a machine slide or comparable component at first a rapid rate for bringing a work piece and a tool relatively toward each other and into close proximity, and then at a slower rate for feeding the tool into the work piece. As an example, reference is made to FIG. 3, wherein a machine 18 is illustrated of the type which drives a tool such as a milling cutter 20. The machine 18 is mounted on the machine slide 14. A work piece 22 to be milled by the cutter 20 is suitably clamped to a work support 25. Alternatively, a tool may be mounted on the support 20 and the work piece 22 clamped to the machine slide 14.

As shown in FIG. 1, propelling means is provided for the machine slide 14 in the form of a threaded rod or lead screw (preferably a ball screw) 24 keyed as at 26 to a bracket 28 of the machine slide 14 so that the screw does not rotate relative thereto, and held by a clamp nut 30 so that it does not move longitudinally relative to the machine slide. The two thereby move as a unit.

The lead screw 24 is propelled longitudinally by gear train output means in the form of an output shaft 32, gears 34 and 36 and a ball type lead screw nut 38, pinned at 41 to a sleeve 43 of the gear 36 as shown in FIG. 2. An adjustable positive stop 15 is provided for the machine slide 14, mounted in a bracket 23 on one end of the way support 21. A second adjustable positive stop 15a is also provided for the machine slide 14 mounted in a bracket 23a on the other end of the way support 21.

A rapid traverse gear train for the output shaft 32 is provided in the form of a gear 40 on the shaft, a planet gear 42 meshing therewith and carried by a planet gear carrier 44, a planet gear 46 connected to the planet gear 42 for rotating it, and a gear 48 on a shaft 50 for rotating the gear 46. The shaft 50 is provided with a pulley 52 which is driven by a belt 54 from a pulley 56 of a rapid traverse motor RM. A brake B is provided for the shaft 50 in the usual form of a normally applied brake which may be released by means of hydraulic pressure or electric current, and which is set by release of hydraulic pressure, or de-energization in the case of an electrically operated brake. Since such a brake is conventional, I will not go into detail as to its construction.

The output shaft 32 is also driven by a slow feed gear train consisting of a worm gear 60 secured to the planet gear carrier 44 and meshing with a worm 62 which in turn is driven by a gear 63 slidably but non-rotatably mounted on a splined portion 64 of the worm 62. The gear 63 is driven by change gears 66 and 68 and by a pinion 70 on a shaft 72 which in turn is driven by a pulley 74, a belt 76 and a pulley 78 from a feed motor FM.

Mechanical features of the foregoing described elements such as bearings, thrust bearings, mounting bosses for the bearings and the like are shown in detail in FIGS. 5 and 7. In FIG. 7 it will be noted that the worm 62 is supported in combination radial and thrust bearings 80 and 82 which in turn are supported in a worm carrier tube 84. The tube 84 is cut out on one side as indicated at 86 to accommodate the worm gear 60. The tube 84 is slidable in bosses 88 and 90, and the direction of thrust thereon caused by the reaction of the worm 62 against the worm gear 60 is indicated by an arrow 85.

The end of the tube 84 opposite the spline 64 is provided with a plug 92 to which a piston 94 is secured. This piston is slidable in a cylinder 96. Conduits 98 and 99 lead from an oil pump P which is driven by a motor M as shown in FIG. 1 independently of the rapid traverse motor RM and the feed motor FM and provides a supply of fluid under pressure for the double-acting cylinder 96. Excess fluid is bled through a pressure relief valve 102 which is adjustable as indicated at 104 so as to maintain a desired predetermined hydraulic pressure in one end of the cylinder 96 for a purpose which will hereinafter appear.

A second pressure relief 102a is adjustable as indicated at 104a so as to maintain a desired predetermined hydraulic pressure in a conduit 98a and thereby the other end of the cylinder 96 for a purpose which will hereinafter appear. The oil pump P receives oil from a sump or the like 106 shown in FIG. 5 and the outlets of the pressure relief valves 102 and 102a may advantageously be in the form of lubricant lines 108 and 108a leading to the various bearings of the unit for lubricating them before the oil is returned to the sump 106.

Referring to FIGS. 1 and 3 limit switches LS1, LS2 and LS2a, and a stop switch SS are shown. The machine slide 14 is provided with actuators 17 and 19 for the switches LS1 and SS and which, as shown in FIG. 2, are adjustable along the slide 14. The tube 84 is provided with adjustable screws 87 and 87a to serve as actuators for the limit switches LS2 and LS2a in opposite directions. FIG. 3 shows starting means for a cycle of operation in the form of a manually operable push button PB.

PRACTICAL OPERATION

Without going into detail with respect to the electrical and/or hydraulic circuits, relay arrangements and the like, the sequence of operation is shown by means of connecting arrows in FIGS. 3, 4, 6, 8 and 9. When the start button PB (FIG. 3) is depressed it operates the usual solenoid valves and pneumatic and/or hydraulic controls as well as the electrical circuits involved which will energize the rapid traverse motor RM and the feed motor FM in forward directions as indicated "(ON)$^F$" and will release the brake B as indicated "RLS." The rapid traverse distance of travel is indicated and also the direction of such travel.

With both motors RM and FM operating (FM in a forward direction), the machine slide 14 will move forward (arrow $a$ in FIG. 3) at a rapid rate by reason of the motor RM driving the ball nut 38 straight through the gears 48, 46, 42, 40, 34 and 36 without planetary action. This is possible because the friction provided by the small lead angle on the worm wheel 60 prevents it from rotating the worm 62 and thus the worm wheel cannot turn. By the same token in most applications and particularly in the present application the worm can be run at the same time which will either be additive to or subtractive from the rapid traverse rate of travel depending on whether the latter is forward or reverse. In the operation being described, the motor FM is rotating the worm gear 60 forwardly at a slow rate so that the actual rate of the machine slide is the rapid rate plus the slow rate.

Thus both the rapid traverse motor and the feed motor start forward at the same time and the fed motor continues to run forward ("(on)$^F$," FIGS. 4, 6 and 8) even during a rapid reverse portion of the machine cycle as will hereinafter appear.

When the rapid traverse distance has been taken up as in FIGS. 1 and 4, it is desirable to shift to the "FEED RATE" indicated in FIG. 4 and this is accomplished by the acuator 17 striking the limit switch LS1 which cuts out the rapid traverse motor RM and sets the brake B automatically as indicated "OFF" and "SET," respectively, and the machine slide will move forwardly as to the dotted position and progress on to the positive stop position of FIG. 6. In FIG. 5, the gear 46 becomes a planet gear walking around the sun gear 48 by rotation of the worm gear 60 and the planet gear carrier 44 from the worm 62, and drives the gear 40 which becomes the driven gear member of the planetary system and causes the lead screw nut 38 to be rotated by the gears 34 and 36 at a slow feed rate. Thus the feed rate is obtained from the feed motor only and its gear train 70, 68, 66, 63 and 62 to the worm gear 60.

FIG. 6 shows the right-hand end of the ball screw 24 engaged with the stop 15 so that the machine slide is thus positively stopped and cannot proceed further. Since the worm gear 60 cannot now rotate as long as the brake B remains set, the worm 62 will commence travelling to the left (it is shown about half way) in opposition to the hydraulic pressure in the left-hand end of the cylinder 96 as the feed motor FM continues to rotate. This pressure is adjusted at 104 to furnish a total force on the piston equal to the thrust of the worm 62 developed by the thrust required at the machine slide 14 due to the machining operation. This also acts as a predetermined pressure for clean up at the bottom of the machining cut, and a safety feature for dull tools and other malfunctioning conditions. The hydraulic pressure may be of very low order because of the mechanical advantage afforded by the worm and worm gear, planetary system and ball type lead screw 24. Thrust capacity is also controlled by the capacity at which the brake B is adjusted to make the planetary system operate.

Further travel of the piston 94 in the cylinder 96 caused by travel of the tube 84 in the direction of arrow $f$ as the tube is carried by the worm 62 as it screws along the teeth of the worm 60 (now held against rotation by engagement at 24, 15) will eventually cause the adjusting screw 87 to trip the limit switch LS2 (FIG. 8) which releases the brake B and energizes the rapid traverse motor RM in the reverse direction "(ON)$^R$" at a much greater speed, and accordingly the machine slide 14 reverses at rapid traverse speed minus the slow feed speed.

When the actuator 19 strikes the stop switch SS as in FIG. 9, the rapid traverse motor RM is deenergized and the brake B set as indicated. The feed motor FM remains energized however. Substantially simultaneously the lead screw 24 engages the positive stop 15$a$ to result in rotation of the worm 62 (because the fed motor FM has not ben deenergized) causing it to drive the tube 84 in the opposite direction (arrow $r$) until a third circuit indicated 109, set up by the switch SS, results in de-energization of the motor FM upon the switch LS2$a$ being actuated by the screw 87$a$. Accordingly slipping of the brake B as in my Patent No. 3,279,321 and the resulting wear thereof is not necessary with the double-acting cylinder and piston arrangement and the associated mechanism herein disclosed. The entire machining system is now in condition for restart as in FIG. 3.

The second pressure relief valve 102$a$ shown in FIG. 1 provides for a back pressure in the right hand end of the cylinder 96 different than that in the left hand end thereof. Usually it is desirable to provide a certain thrust in one direction and a distinctly lighter thrust in the opposite direction depending of course on various factors, and the settings of the relief valves 102 and 102$a$ are therefore adjustable to suit any particular job set-up.

From the foregoing specification it will be obvious that I have provided a means for driving the machine slide or the like at a rapid rate and then at a slower rate with a positive, constant, yet adjustable force, up to and against a positive stop. Summarizing the operation through a complete machine cycle, fluid from the hydraulic pump which is driven throughout the cycle maintains a constant pressure and constant supply of fluid for the cylinder 96. This pressure operates in opposition to the thrust of the worm 62 after the positive stop positions of FIGS. 6 and 9 have been attained, thereby causing thrust load (during dwell periods) to build up in the worm. Such thrust is transmitted to the worm carrier tube 84 through the thrust bearings for the worm. The thrust force exceeds the force in the hydraulic cylinder and allows the piston, worm carrier tube and worm to travel in one direction or the other while the machine slide remains against one positive stop or the other with their original constant forces as set by the presure relief valves 102 and 102$a$. After the worm and its carrier tube have travelled for a predetermined distance, the limit switch LS2 or LS2$a$ as the case may be comes into operation to reverse the machine slide or terminate the machine cycle. The dwell time for the tool to clean up at the bottom or end of its work stroke is the time the machine slide is against one positive stop, and the reverse (arrow $r$ in FIG. 9) travel time of the worm carrier tube is the time the machine slide is against the other positive stop where it rests until a subsequent machine cycle is initiated as in FIG. 3.

I claim as my invention:

1. In a screw feed machine unit, a machine slide, and lead screw means for propelling said slide during machining operations comprising a rapid traverse gear train having output means to said lead screw means, first power means for operating said rapid traverse gear train, a slow feed gear train so operatively connected to said rapid traverse gear train as to operate said output means, second power means for operating said slow feed gear train, means for energizing said first and second power means in a forward direction to effect rapid traverse of said machine slide by the operation of both gear trains in conjunction with each other, and control means operable by the position of said machine slide at the end of a rapid traverse travel and the beginning of a feed rate travel to stop said rapid traverse gear train whereupon only said slow feed gear train is operable through said output means on said lead screw means, said slow feed gear train including a worm driven by said second power means, a worm gear driven by said worm, a positive stop being engageable by said machine slide in one direction for stopping said slide and rotation of said worm gear, said worm being movable longitudinally in a reverse direction upon said worm gear being stopped, said control means being actuated by the reverse movement of said worm after predetermined travel thereof, and a second positive stop being engageable by said machine slide in the reverse direction for stopping said slide and rotation of said worm gear and effecting similar reverse longitudinal movement of said worm and thereby operation of said control means.

2. A screw feed machine unit in accordance with claim 1 wherein hydraulic means opposes the thrust of said worm in either direction, said worm, upon overcoming the opposition of said hydraulic means, travelling axially in one direction or the other with respect to said worm gear depending on the direction of rotation of said first power means, said control means being operable thereby after predetermined travel thereof in one direction to reversely energize said first power means and after predetermined travel thereof in the other direction de-energizing said second power means, said slide, prior to engaging said second positive stop, de-energizing said first power means.

3. A screw feed machine unit in accordance with claim 1 wherein a second control means is provided which is responsive to the position of said machine slide at the end of its reverse movement to de-energize both said first and second power means after the machine slide engages said second positive stop and said worm travels a predetermined distance in said reverse longitudinal direction.

4. A screw feed machine unit in accordance with claim 3 wherein a brake is provided for said first power means, and means is provided to release said brake when said first and second power means are energized and to set said brake when said first mentioned control means is first operated.

5. A screw feed machine unit in accordance with claim 4 wherein means is provided to release said brake when said first power means is reversely energized.

6. A screw feed machine unit in accordance with claim 5 wherein said brake is also set when said machine slide is stopped by said second positive stop.

7. A screw feed machine unit in accordance with claim 1 wherein hydraulic means is provided opposing said worm, and said worm upon overcoming the opposition of said hydraulic means travels axially with respect to said worm gear, and control means is provided operable thereby after predetermined travel thereof to energize said first power means in a reverse direction.

8. A screw feed machine unit in accordance with claim 7 wherein control means is actuated by said machine slide after both the end of its reverse movement when stopped by said second positive stop and reverse longitudinal movement of said worm to de-energize both said first and second power means.

9. A screw feed machine unit in accordance with claim 8 wherein a brake is provided for said first power means, and means is provided to release said brake when said first and second power means are energized and to set said brake when said control means is first operated.

10. A screw feed machine unit in accordance with claim 9 wherein means is provided to release said brake when said first power means is reversely energized.

11. A screw feed machine unit in accordance with claim 10 wherein said brake is also set when said machine slide is stopped by said second positive stop.

12. In a screw feed machine unit, a machine slide, and lead screw means for propelling said slide in either forward or backward directions during machining operations including reversible power means, output means therefrom which is operatively connected to said machine slide, said operative connection including planetary gearing having a planetary gear carrier rotatable about said output means and provided with a worm gear, a worm driven by said power means and meshing with said worm gear, said worm being axially movable in a direction reverse to that in which the machine slide is being propelled upon stoppage of the rotation of said worm gear, positive stops for said machine slide to stop the movement thereof in either of said directions and thereby to stop rotation of said worm gear, means to resist such axial movement of said worm gear in either of said directions, independent means to predetermine the degree of resistance in either of said directions, and control means for said power means actuated by axial movement of said worm gear in either of said reverse directions.

13. A screw feed machine unit in accordance with claim 12 wherein said worm, upon overcoming the opposition of said resisting means, travels axially in one direction or the other with respect to said worm gear depending of the direction of rotation of said power means, said control means being operable thereby after predetermined axial travel of said worm in one direction to reversely energize said power means and after predetermined axial travel in the reverse direction to deenergize said power means.

14. A screw feed machine unit in accordance with claim 13 wherein an additional control means is provided which is responsive to the position of said machine slide at the end of its reverse movement to de-energize said power means only after the machine slide engages one of said positive stops and said worm travels axially a predetermined distance in said revese direction.

15. A screw feed machine unit in accordance with claim 14 wherein a brake is provided for said power means, and means is provided to release said brake when said power means is energized and to set said brake when said control means is first operated.

16. A screw feed machine unit in accordance with claim 15 wherein means is provided to release said brake when said power means is reversely energized.

17. A screw feed machine unit in accordance with claim 16 wherein said brake is also set when said machine slide, upon travelling in the reverse direction, is stopped by one of said positive stops.

18. A screw feed machine unit in accordance with claim 12 wherein hydraulic means is provided opposing said worm, and said worm upon overcoming the opposition of said hydraulic means, travels axially with respect to said worm gear, and control means is provided operable thereby after predetermined travel thereof to energize said power means in a reverse direction.

19. A screw feed machine unit in accordance with claim 18 wherein said control means is actuated by said machine slide after both the end of its reverse movement when stopped by one of said positive stops and at the end of reverse longitudinal movement of said worm to de-energize said power means.

20. A screw feed machine unit in accordance with claim 19 wherein a brake is provided for said power means, and means is provided to release said brake when said power means is energized and to set said brake when said control means is first operated.

21. A screw feed machine unit in accordance with claim 20 wherein means is provided to release said brake when said power means is reversely energized.

22. A screw feed machine unit in accordance with claim 21 wherein said brake is also set when said machine slide, upon travelling in the reverse direction, is stopped by one of said positive stops.

References Cited

UNITED STATES PATENTS

| | | | |
|---|---|---|---|
| 2,121,923 | 6/1938 | Neubert | 90—21 |
| 2,398,346 | 4/1946 | Anderson | 90—21 |
| 2,519,042 | 8/1950 | Granberg et al. | 90—21 |
| 3,279,321 | 10/1966 | Muhl | 90—21 |

GIL WEIDENFELD, Primary Examiner

U.S. Cl. X.R.

77—32.5, 32.9